(12) United States Patent
Schmidt et al.

(10) Patent No.: US 10,794,464 B2
(45) Date of Patent: Oct. 6, 2020

(54) TRANSMISSION HAVING A SHAFT, A HOUSING PART AND AN ADAPTER HOUSING

(71) Applicant: SEW-EURODRIVE GMBH & CO. KG, Bruchsal (DE)

(72) Inventors: Rolf Schmidt, Kraichtal (DE); Andreas Sigmund, Bruchsal (DE)

(73) Assignee: SEW-EURODRIVE GMBH & CO. KG (DE)

( * ) Notice: Subject to any disclaimer, the term of this patent is extended or adjusted under 35 U.S.C. 154(b) by 0 days.

(21) Appl. No.: 16/343,499

(22) PCT Filed: Sep. 19, 2017

(86) PCT No.: PCT/EP2017/025259
§ 371 (c)(1),
(2) Date: Apr. 19, 2019

(87) PCT Pub. No.: WO2018/072885
PCT Pub. Date: Apr. 26, 2018

(65) Prior Publication Data
US 2019/0242470 A1  Aug. 8, 2019

(30) Foreign Application Priority Data
Oct. 19, 2016 (DE) .......................... 10 2016 012 501

(51) Int. Cl.
*F16H 57/029* (2012.01)
*F16J 15/54* (2006.01)
(Continued)

(52) U.S. Cl.
CPC ......... *F16H 57/029* (2013.01); *F16H 57/021* (2013.01); *F16H 57/032* (2013.01);
(Continued)

(58) Field of Classification Search
CPC .. F16H 57/029; F16H 57/021; F16H 57/0457; F16H 57/032; F16J 15/3204; F16J 15/54
See application file for complete search history.

(56) References Cited

U.S. PATENT DOCUMENTS 5,823,541 A    10/1998   Dietle et al.
7,121,974 B2 * 10/2006   Bayer ...................... F16H 1/28
                                                                            475/331
(Continued)

FOREIGN PATENT DOCUMENTS

CN      204226186 U    3/2015
DE   102012000666 A1   7/2013
(Continued)

OTHER PUBLICATIONS

International Search Report dated Nov. 22, 2017, in International Application No. PCT/EP2017/025259 (English-language translation).

(Continued)

*Primary Examiner* — Thomas C Diaz
(74) *Attorney, Agent, or Firm* — Carter, DeLuca & Farrell LLP (57) ABSTRACT

A transmission includes a shaft, a housing part and an adapter housing, the housing part and the adapter housing being connected. A first bearing for mounting the shaft is accommodated in the adapter housing, and a second bearing for mounting the shaft is accommodated in the housing part. A space region is situated in the housing part, which is at least partially filled with lubricating oil and is limited by and/or sealed from the adapter housing with the aid of at least one first shaft sealing ring. On the side of the first shaft sealing ring facing away from the space region, in particular on the side of the first sealing ring axially facing away from the space region, a sealing ring is situated on the shaft, which is connected to the shaft in a torsionally fixed manner, in (Continued)

particular pressed and/or slipped onto the shaft, the sealing ring at least partially projects into a recess of the adapter housing, the recess including a circumferential depression, which is limited by a wall region of the adapter housing in the direction of the shaft, the sealing ring touches the wall region or radially projects from the wall region, in particular such that lubricating oil that axially flows down the shaft is drained into the recess or the depression, and a sensor for detecting lubricating oil that has drained into the depression is situated on the adapter housing, in particular in a radially oriented bore hole that terminates in the depression.

27 Claims, 5 Drawing Sheets

(51) Int. Cl.
*F16H 57/021* (2012.01)
*F16H 57/032* (2012.01)
*F16H 57/04* (2010.01)
*F16J 15/3204* (2016.01)
*F16H 57/02* (2012.01)

(52) U.S. Cl.
CPC ...... *F16H 57/0457* (2013.01); *F16J 15/3204* (2013.01); *F16J 15/54* (2013.01); *F16H 2057/02073* (2013.01)

(56) References Cited

U.S. PATENT DOCUMENTS

| | | |
|---|---|---|
| 2005/0093246 A1 | 5/2005 | Dietle et al. |
| 2015/0104291 A1 | 4/2015 | Kosmicki et al. |

FOREIGN PATENT DOCUMENTS

| | | |
|---|---|---|
| DE | 102012007626 A1 | 10/2013 |
| WO | WO 2010009871 A1 | 1/2010 |

OTHER PUBLICATIONS

European Patent Office, Office Action dated Apr. 28, 2020 in EP Application No. 17771339.3 (English-language machine translation).

* cited by examiner

TRANSMISSION HAVING A SHAFT, A HOUSING PART AND AN ADAPTER HOUSING

FIELD OF THE INVENTION

The present invention relates to a transmission having a shaft, a housing part and an adapter housing.

BACKGROUND INFORMATION

Certain conventional transmissions have a housing part in which a shaft such as an output shaft is mounted and which is at least partially filled with lubricating oil.

SUMMARY

Example embodiments of the present invention provide a transmission that achieves greater reliability of the system in which the transmission is used.

According to an example embodiment of the present invention, a transmission includes a shaft, a housing part and an adapter housing, the housing part and the adapter housing are connected, a first bearing for mounting the shaft is accommodated in the adapter housing, and a second bearing for mounting the shaft is accommodated in the housing part. A space region which is at least partially filled with lubricating oil is disposed in the housing part and limited by and/or sealed from the adapter housing with the aid of at least one first shaft sealing ring, in particular, the first shaft sealing ring is connected to the housing part in a torsionally fixed manner and seals with respect to the shaft, and/or the first shaft sealing ring runs on the shaft, and/or a sealing lip of the first shaft sealing ring touches the shaft. On the side of the first shaft sealing ring facing away from the space region, in particular on the side of the first shaft sealing ring axially facing away from the space region, a sealing ring is situated on the shaft, which is connected to the shaft in a torsionally fixed manner and, in particular, is pressed and/or slipped onto the shaft. The sealing ring at least partially projects into a recess of the adapter housing, the recess includes a circumferential depression, which is limited by a wall region of the adapter housing in the direction of the shaft, the sealing ring touches the wall region or radially projects from it, in particular so that lubricating oil that axially flows down the shaft drains into the recess or depression, and a sensor for detecting lubricating oil that drains into the depression is situated on the adapter housing, in particular in a radially oriented bore hole that terminates in the depression.

This has the advantage that during an installation alignment of the transmission, where the axial direction corresponds to the gravitational direction, lubricating oil will not flow out of the transmission, but in the event of a leak of the first shaft sealing ring, the escaping lubricating oil is drained or spun off into the annular depression. As a result, a sensor is able to detect the lubricating oil and a corresponding warning may be displayed or forwarded. For if the shaft has a rotational speed that is above a minimum rotational speed, the lubricating oil is spun off from the radially projecting sealing ring into the recess and is carried away from the adapter housing to the trough-like depression. However, even at a rotational speed that is below the minimum rotational speed such as during a standstill of the shaft, the lubricating oil is drained via the sealing ring into the depression. In this manner, too, the lubricating oil that has escaped due to the leakage is conveyed to the depression and may be detected by the sensor.

The ring axis of the annular depression, i.e. a depression that resembles an annular groove, may be aligned parallel to the axial direction and thus also the gravitational direction.

In example embodiments, the wall region is radially situated between the depression and the shaft. This offers the advantage that the depression is molded on the radial inner side of the adapter housing in the manner of an undercut. A trough-like depression, i.e. a depression corresponding to an annular groove, is formed by the wall region. The depression extends in the axial direction, is axially symmetrical and opens radially toward the inside so that the lubricating oil that is radially spun off toward the outside is able to be trapped and collected at the bottom of the depression.

In example embodiments, the depression is arranged in the form of a ring and limited by the wall region and the rest of the adapter housing. This has the advantage that the depression evenly surrounds the shaft in the circumferential direction and extends in the axial direction but is radially open toward the lubricating-oil supply.

In example embodiments, the radial clearance region covered by the sealing ring overlaps with the radial clearance region covered by the wall region. This has the advantage that the sealing ring radially projects so that the lubricating oil is able to drip or be drained in the direction of the depression when the shaft is not rotating. In the installation direction of the transmission, the axial direction is aligned in the gravitational direction.

In example embodiments, the sealing ring is set apart from the adapter housing in the radial direction with the aid of the recess, the sealing ring in particular providing sealing from the wall region of the adapter housing. This offers the advantage that the sealing ring may have a radially projecting configuration so that the lubricating oil is able to be spun off toward the adapter housing. Lubricating oil is therefore able to be carried away from the shaft in a reliable manner, at least when the shaft is rotating at a sufficient speed.

In example embodiments, the first shaft sealing ring is accommodated by a first ring part, in particular at the inner side of the ring part, the first ring part is accommodated in the housing part, and the first ring part particularly being tightly connected to the housing part, in particular in an intermaterial manner, in particular bonded, in particular such that the first shaft sealing ring is radially situated between the first ring part and the shaft. This offers the advantage that the shaft sealing ring is able to be mounted on a small diameter.

In example embodiments, a second shaft sealing ring seals the space region surrounded by the adapter housing from the environment. This offers the advantage that greater safety is achievable so that even in the event of a leak of the first shaft sealing ring, the oil will at least still be carried away from the sealing ring, and in the event of an additional failure of said sealing ring, the second shaft sealing ring provides additional sealing.

In example embodiments, the second shaft sealing ring is accommodated by a second ring part, in particular at the inner side of the second ring part, the second ring part is accommodated in the housing part, the second ring part in particular being tightly connected to the housing part, in particular in an intermaterial manner, in particular bonded, in particular such that the second shaft sealing ring is radially situated between the second ring part and the shaft. This is considered advantageous insofar as the shaft sealing ring is able to be mounted on a small diameter.

In example embodiments, the sealing ring is axially situated between the first and the second ring part. This has the advantage that lubricating oil that is encountered due to a leakage at the first shaft sealing ring is still able to be prevented from escaping from the transmission with the aid of the sealing ring, and that it is carried towards the depression in which it can be detected with the aid of a sensor. In addition, a second shaft sealing ring, which is accommodated by the second ring part, acts as a further seal.

In example embodiments, the sealing ring has a spin-off edge region and a sealing lip, in particular, a radial constriction is provided on the sealing ring between the spin-off edge region and the sealing lip. This offers the advantage that the lubricating oil is able to drip off the spin-off edge when the shaft is not rotating. This allows for faster draining into the depression.

In example embodiments, the radial outer diameter of the sealing ring monotonically increases with increasing distance from the space region filled at least partially with lubricating oil, so that a spin-off edge region may be formed, whereupon it decreases to form a radial constriction and then increases again to form the sealing lip. This has the advantage that a radial drainage from the shaft takes place in a safe manner and a leakage into the environment is therefore prevented. In addition, the speed, and thus the centrifugal force, becomes greater in the radially outward direction when the shaft is rotating so that a spin-off is able to take place.

In example embodiments, the sealing ring is arranged as a rotationally symmetrical body. This is considered advantageous insofar as it allows for an uncomplicated production.

In example embodiments, the sealing lip of the sealing ring has a wall thickness that decreases monotonically with increasing distance from the spin-off edge region. This offers the advantage that it is possible to obtain an elastic pressing against the contact surface that is provided on the wall region.

In example embodiments, the sealing lip of the sealing ring is elastically pressed against the adapter housing, in particular against a contact surface provided on the adapter housing, the contact surface in particular being planar, and the normal direction of the planar contact surface being aligned in parallel with respect to the axial direction. This is considered advantageous insofar as improved tightness is able to be achieved.

In example embodiments, the adapter housing is made of a harder material than the housing part, in particular, the adapter housing is made of GGG40 and the housing part is made of GG25. This has the advantage that greater transverse forces may be provided in the transmission.

In example embodiments, the first bearing is axially situated between the sealing ring and the second shaft sealing ring. This offers the advantage that a greater distance may be realized between the first shaft sealing ring and the output-side bearing, i.e. the first bearing. High transverse forces are thus acceptable in the transmission.

In example embodiments, the first bearing is arranged as an angular contact bearing. This is considered advantageous insofar as high transverse forces are able to be accepted.

In example embodiments, the first shaft sealing ring includes two shaft sealing rings that are axially situated next to each other, in particular so as to touch each other. This offers the advantage that even better sealing is achievable. This is because if one of the shaft sealing rings were to fail, a further shaft sealing ring is still available.

In example embodiments, the second shaft sealing ring includes two shaft sealing rings that are axially situated next to each other, in particular so as to touch each other. This offers the advantage that even better sealing, i.e. more reliable sealing, is able to be provided. This is because if one of the shaft sealing rings were to fail, a further shaft sealing ring is still available.

In example embodiments, a shaft sealing ring, which seals the housing part from the shaft, is situated on the side of the second bearing that is axially facing away from the space region partially filled with lubricating oil. This offers the advantage of providing great tightness.

In example embodiments, a locking washer axially limits the second shaft sealing ring, the locking washer in particular being connected to the first ring part with the aid of screws. This offers the advantage of preventing a shaft sealing ring from protruding in the direction of the environment.

In example embodiments, the first ring part is intermaterially connected to the adapter housing, in particular by bonding. This is considered advantageous insofar as great tightness is achievable. In addition, a sufficiently large receiving recess for the ring part is able to be provided in the housing part and also in the adapter housing part, so that the first and/or the second bearing is/are able to be introduced into the respective seat. High tightness is achievable on account of the intermaterial connection.

In example embodiments, the second ring part is intermaterially connected to the housing part, in particular bonded to the housing part. This is considered advantageous insofar as high tightness is achievable as well.

Further features and aspects of example embodiments of the present invention are described in greater detail below with reference to the appended Figures.

DETAILED DESCRIPTION

As illustrated in the Figures, the transmission housing has a housing part 1 and an adapter housing 2, which are connected to each other, preferably with the aid of screws.

Output shaft 25 of the transmission is mounted by a first bearing 27 in adapter housing 2 and by a second bearing 32 in housing part 1. A geared part, in particular a toothed wheel 31, whose toothing meshes with the toothing of a further geared part that is connected in a torsionally fixed manner to an intermediate shaft which is mounted via bearings in housing part 1, is connected to the output shaft in a torsionally fixed manner. The input shaft of the transmission is also mounted in housing part 1 and includes a toothed part, which is connected to it in a torsionally fixed manner and in turn meshes with the toothed part that is connected to the intermediate shaft in a torsionally fixed manner, or—in a higher-stage configuration—to a toothed part which is connected to a further intermediate shaft in a torsionally fixed manner.

In the direction of the environment, shaft sealing rings 33 are axially situated adjacent to second bearing 32 of shaft 25. Shaft 25 may have a vertical orientation, which means that shaft sealing rings 33 are disposed at a greater height than second bearing 32.

On the output side, or in other words in the downward direction in an exemplary use, shaft 25 is guided through a recess of adapter housing 2, in which a ring part 22 is situated which accommodates shaft sealing rings 24 whose respective sealing lips run on shaft 25. Shaft sealing rings 24 thus seal shaft 25 with respect to ring part 22.

Ring part 22 itself, on the other hand, is tightly connected to adapter housing 2, in particular by press-fitting and/or bonding.

In other words, ring part 22 is interposed between shaft sealing ring 24 and adapter housing 2.

A safety washer 21 is connected to ring part 22 with the aid of a screw 23. For this purpose, ring part 22 has an axially oriented threaded bore into which screw 23 is screwed and thereby presses safety washer 21 against ring part 22 with the aid of its screw head. A protrusion of shaft sealing rings 24 in the direction of the environment is therefore prevented because safety washer 21 is at least resting against the shaft sealing ring situated axially farther outside, i.e. below in the direction of the environment. The two shaft sealing rings 24 have the same configuration and are accommodated in the same bearing seat provided on ring part 22. Shaft sealing rings 24 have at least one sealing lip in each case, which runs on shaft 25. Thus, even if one of shaft sealing rings 24 were to fail, a further shaft sealing ring 24 will still be functioning.

The interior of the transmission encompassing the toothed parts is filled with lubricating oil. Housing part 1 of the transmission has a recess through which shaft 25 is guided toward adapter housing 1. A ring part 20, which may have the same configuration as aforementioned ring part 22 and thus also has the axially oriented threaded bore, is accommodated in the recess. However, no screw is screwed into the threaded bore of ring part 20. Ring part 22 is tightly connected to housing part 1, in particular by press-fitting and/or bonding.

Ring part 20 once again accommodates shaft sealing rings 26 at its radially inner side, which provide sealing between ring part 20 and shaft 25.

In other words, ring part 20 is interposed between shaft sealing ring 26 and housing part 1.

Thus, the interior space of the transmission filled at least partially with lubricating oil is sealed from the interior space region encompassed by adapter housing 2.

In the event of a failure of one of shaft sealing rings 26, the second shaft sealing ring 26, which is accommodated in the same bearing seat of ring part 20, takes over the sealing function. However, if this second shaft sealing ring 26 fails as well, a further seal is provided.

This further seal is arranged as a sealing ring 30, which has a radially projecting spin-off edge region 42 at its end facing shaft sealing ring 26, which radially drains lubricating oil flowing vertically down shaft 25 with the aid of its radial projection, and radially spins it off toward the outside at spin-off edge region 42, into an annular depression 28 that is provided in adapter housing 2, in particular an annular depression 28 formed by an undercut.

Depression 28 is molded during the production of adapter housing 2 in a casting process. The adapter housing has a radially oriented recess at a circumferential point of depression 28, where a sensor 29 is situated for detecting lubricating oil.

Thus, if lubricating oil that was spun off from spin-off edge region 42 collects in depression 28, this is detected by sensor 29 so that a warning message is able to be emitted. Sensor 29 is connected to a higher-level electronic control for such a purpose with the aid of a signal line, so that the detected lubricating oil results in a corresponding item of information in the control, which then suitable measures such as the deactivation of the drive that is driving the transmission, a reduction of the rotational speed or a shutdown of the drive driving the transmission and/or a display or transmission of a corresponding warning or defect report.

As previously described, sealing ring 30 is tightly resting against shaft 25. The upper end region of sealing ring 30 radially projects as a spin-off edge region 42 so that downwardly draining lubricating oil is routed away from shaft 25 radially toward the outside. Since a high rotational speed is present, the lubricating oil is radially spun off once a minimum rotational speed has been exceeded and is caught by the wall of annular depression 28. The lubricating oil trapped in this manner then collects at the bottom of depression 28 and flows in a circumferential direction to the radial recess accommodating sensor 29.

When shaft 25 is not rotating, the lubricating oil drips from spin-off edge region 42, and thus directly toward the bottom of annular depression 28 or onto a radially projecting sealing lip 41 of sealing ring 30, from where it is routed to the wall of annular depression 28. Thus, even in the case of a non-rotating shaft or a shaft 25 which exhibits a rotational speed below the minimum rotational speed, the lubricating oil collects in annular depression 28.

A notch is provided on sealing ring 30 axially between sealing lip 41 and spin-off edge region 42.

Sealing lip 41 contacts adapter housing 2. The contact surface on adapter housing 2 arranged for sealing lip 41 is finely machined and forms a substantially planar region whose normal direction is substantially parallel to the axial direction.

Lubricating oil that drains at sealing lip 41 on the side of sealing ring 30 that faces away from shaft 25 thus flows away from the contact surface and into annular depression 28, in particular towards the bottom region of this depression 28.

To form sealing lip 41 and spin-off edge region 42, sealing ring 30 has a radial outer diameter that initially increases from its outermost axial end in the axial direction so as to form spin-off edge region 42, then decreases in order to form a radial constriction between sealing lip 41 and spin-off edge region 42, and then increases again in order to form sealing lip 41.

Sealing lip 41 itself has a monotonically decreasing wall thickness in the direction of adapter housing 2. Sealing lip 41 is elastically pressed against the contact surface which is acting as a running surface. Thus, sealing that goes beyond shaft sealing rings 26 is achieved with the aid of sealing ring 30. This seal formed by sealing ring 30 needs to work only in a safety case until sensor 29 has detected the oil that has leaked due to the oil leakage.

The depression extending in the circumferential direction is formed by an undercut in adapter housing 2, which is created already during the casting of adapter housing 2 and requires no post-machining. Only the contact surface, which serves as a running surface, must be finely machined. Of course, the radially oriented recess in adapter housing 2, which accommodates sensor 29, must also be produced by drilling.

The material of adapter housing 2 is harder than the material of housing part 1. Both (1, 2) are produced from cast steel, in particular grey cast iron. GGG40 may be used as the material of adapter housing 2 and GGG25 may be used as the material of housing part 1. An advantage over the use of material of equal hardness for adapter housing 2 and housing part 1 is that shaft 25 is able to be given an axially longer configuration and adapter housing 2 is able to absorb the greater transverse forces that results from the axially longer configuration.

With the aid of ring parts 20 and 22, shaft sealing rings 24 and 26 are resting on a smaller diameter and thus are exposed to lower relative speeds. This makes it possible to achieve a longer service life and provides a further increase in safety.

The identical configuration of ring parts 20 and 22 additionally allows for a low number of parts.

Depression 28 is introduced into adapter housing 2 and is thus limited by a wall region 34 with respect to shaft 25 and by the remaining adapter housing 2 in the other directions. In other words, wall region 34 is radially situated between depression 28 and shaft 25.

The radial clearance region covered by the rolling bodies of the angular contact bearing, i.e. the bearing on the output side, also includes the greatest radial clearance value of the first and/or second shaft sealing ring (24, 26). Thus, it is possible to use shaft sealing rings (24, 26) whose outer diameters are smaller than the greatest diameter value assumed by the rolling bodies of the angular contact bearing. In addition, such shaft sealing rings (24, 26) whose outer diameter is greater than the smallest diameter value assumed by the rolling bodies of the angular contact bearing, may be used.

Shaft 25 has a constant diameter, i.e. in cylindrical form, in the axial region covered by wall region 34 and sealing ring 30.

In example embodiments, sealing ring 30 is arranged to project into the recess of adapter housing 2 to such a depth that the lubricating oil drained from shaft 25 drips down into annular depression 28 when shaft 25 is not rotating. Sealing ring 30 radially projects from wall region 34 for this purpose. An axially downwardly projecting collar region, which acts as a drip edge, may be formed on sealing ring 30. When shaft 25 is rotating, the lubricating oil is spun off against the adapter housing, as was also the case in the previously described exemplary embodiment, that is to say, against the surface region of adapter housing 2 that limits the recess.

Figure 1:
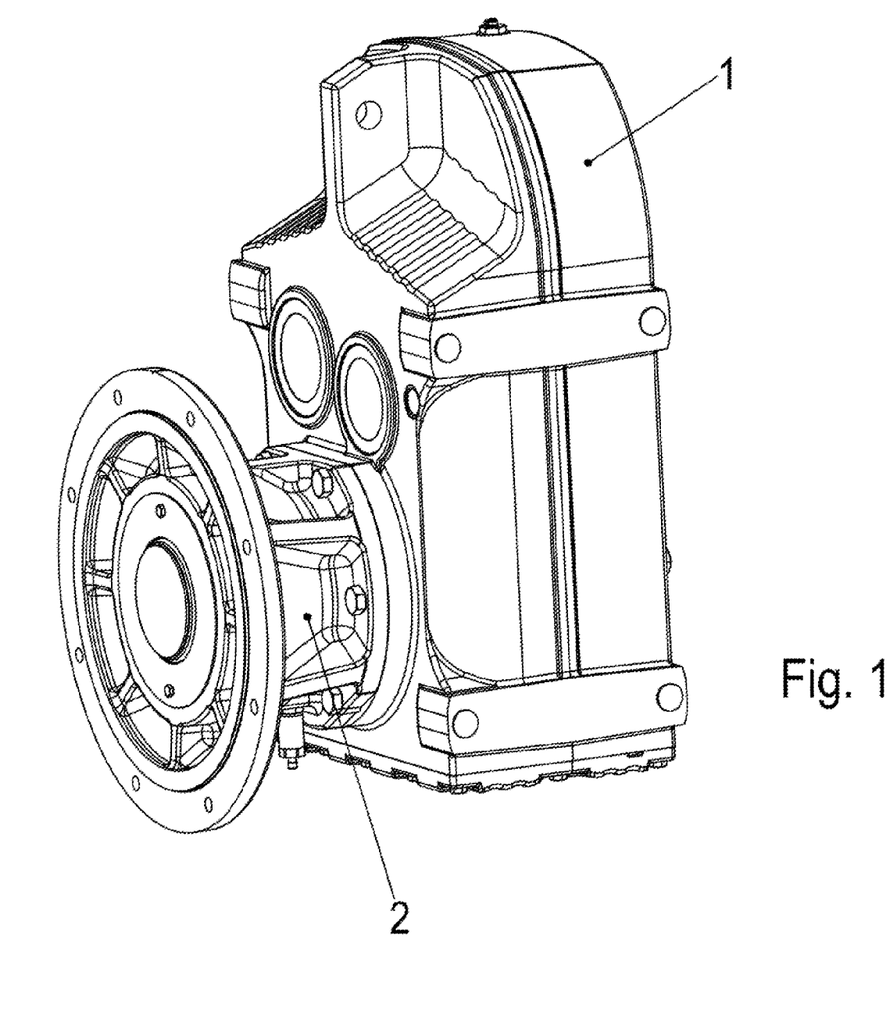
FIG. 1 is an oblique view of a transmission according to an example embodiment of the present invention.
Figure 2:
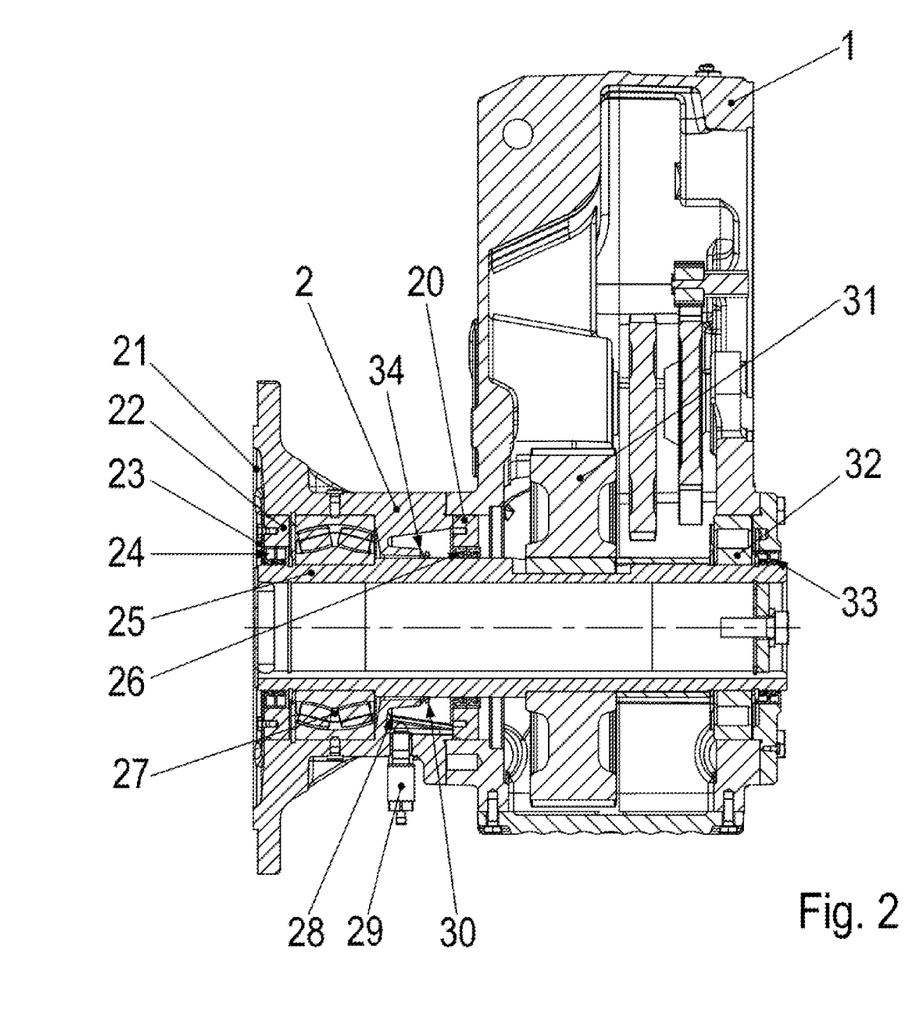
FIG. 2 is a cross-sectional view through the transmission.
Figure 3:
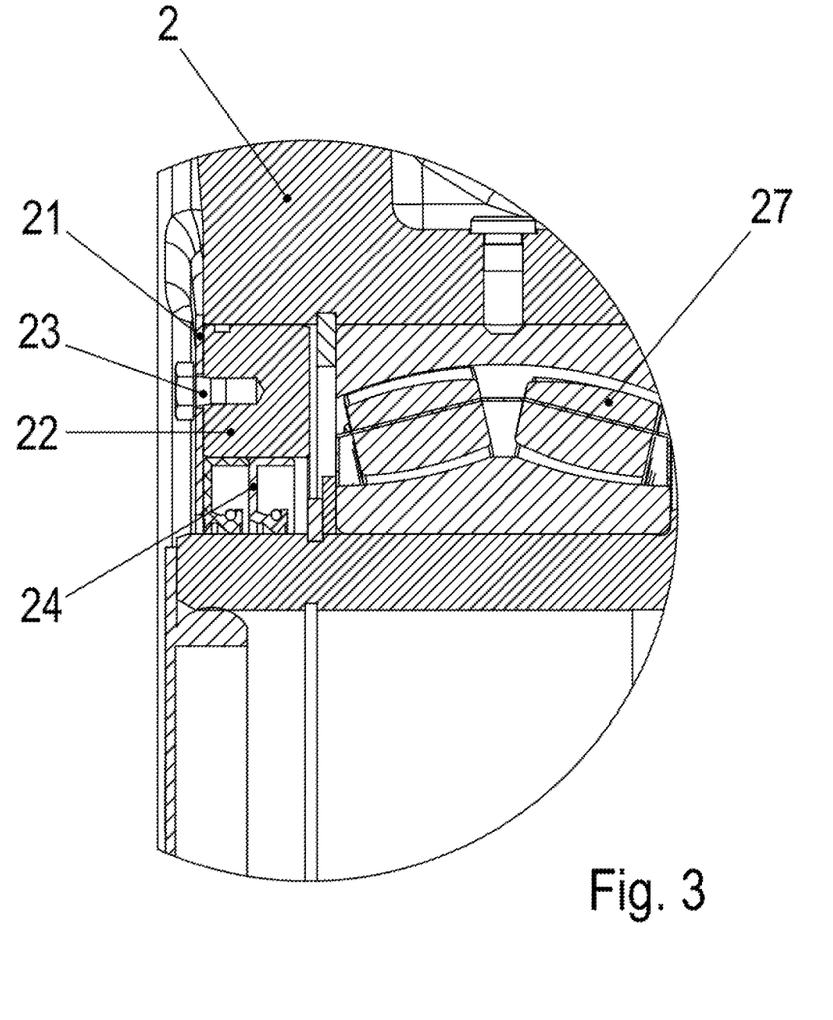
FIG. 3 is an enlarged portion of FIG. 2 in the area of the sealing point on the output side.
Figure 4:
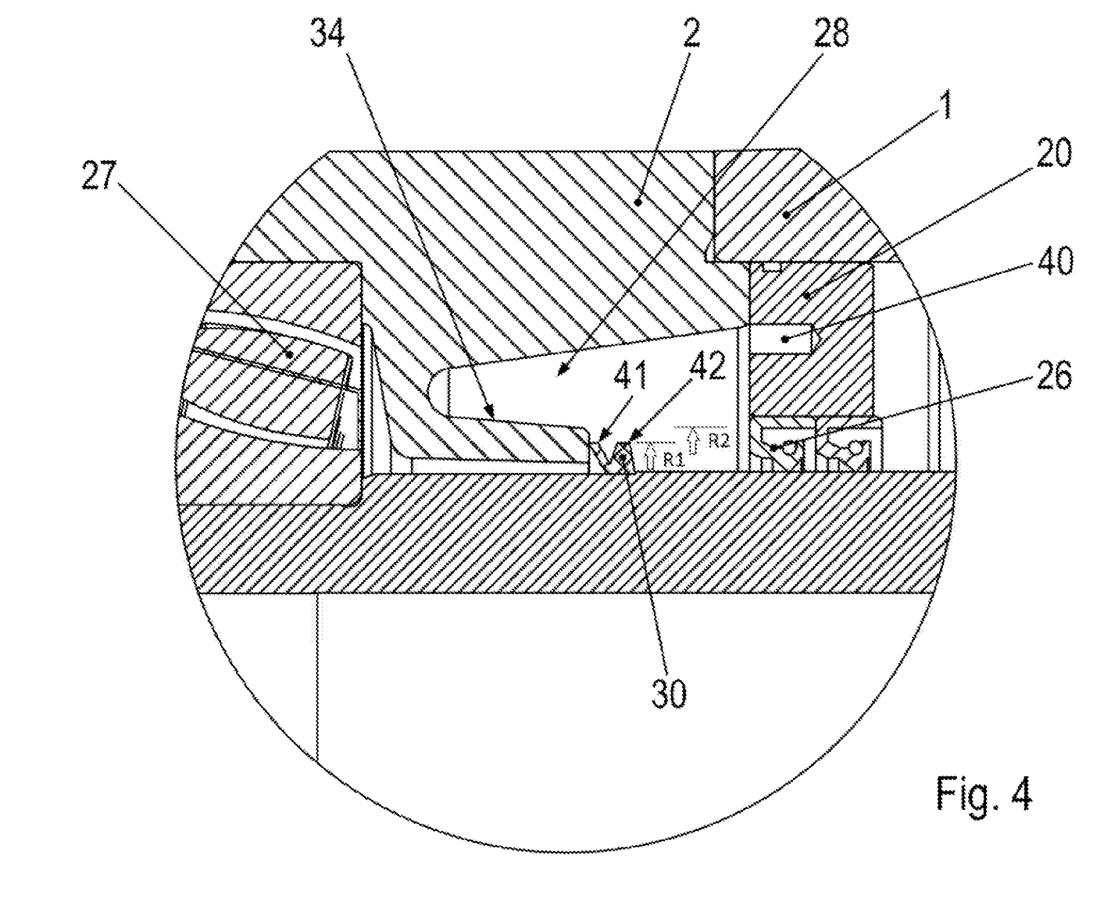
FIG. 4 is an enlarged portion of FIG. 2 in the area of a further seal on the inner side for the purpose of increasing the reliability.
Figure 5:
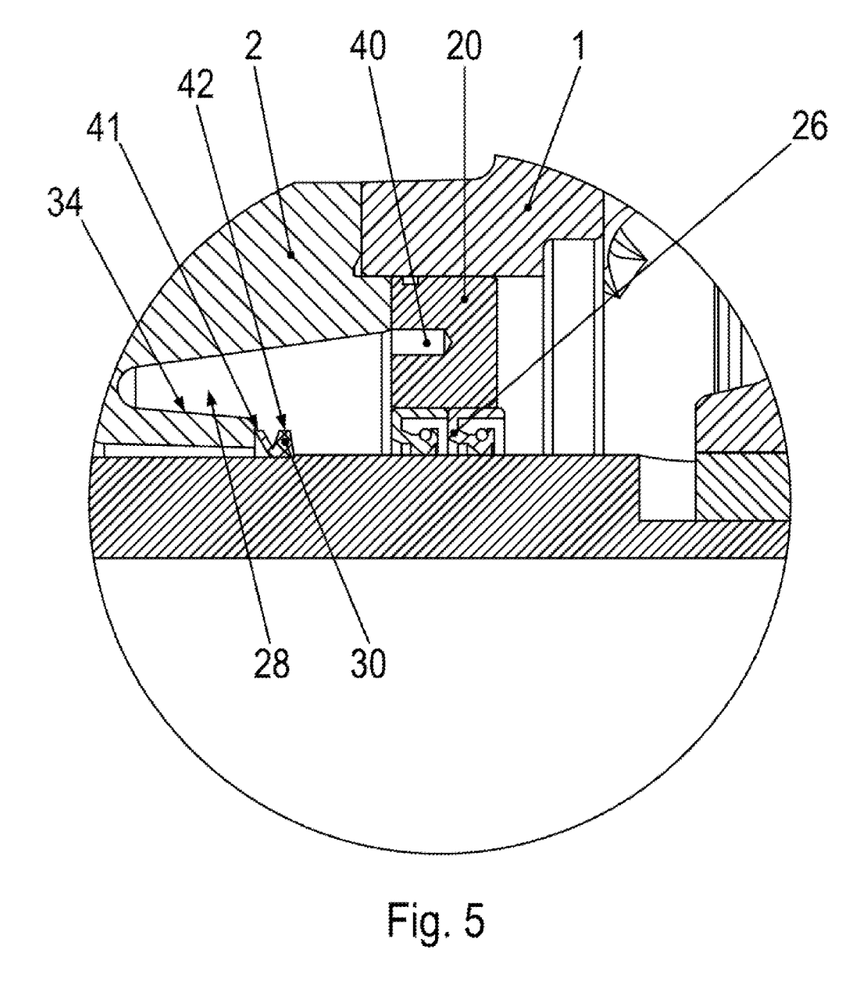
FIG. 5 is a further enlarged portion of FIG. 2 in the area of a further inside seal for increasing the reliability.

As illustrated in FIG. 4, for example, a radial clearance region R1 covered by the sealing ring 30 may overlap a radial clearance region R2 covered by the wall region 34.

LIST OF REFERENCE NUMERALS 1 housing part
2 adapter housing
20 ring part, in particular including an axially oriented threaded bore
21 safety washer
22 ring part, in particular including an axially oriented threaded bore
23 screw
24 shaft sealing ring
25 shaft, in particular output shaft
26 shaft sealing ring
27 first bearing
28 annular depression, in particular an annular depression formed by an undercut
29 sensor
30 sealing ring
31 toothed wheel
32 second bearing
33 shaft sealing ring
34 wall region of adapter housing 2
40 axially oriented threaded bore for screw 23
41 sealing lip
42 spin-off edge region

The invention claimed is:

1. A transmission, comprising:
   a shaft;
   a housing part;
   an adapter housing connected to the housing part;
   a first bearing accommodated in the adapter housing and mounting the shaft; and
   a second bearing accommodated in the housing part and mounting the shaft;
   wherein the housing part includes a space region at least partially filled with lubricating oil and limited by and/or sealed from the adapter housing by a first shaft sealing ring;
   wherein a sealing ring is provided on a side of the first shaft sealing ring facing away from the space region and/or on a side of the first shaft sealing ring axially facing away from the space region, the sealing ring being connected to the shaft in a torsionally fixed manner, pressed onto the shaft, and/or slipped onto the shaft;
   wherein the sealing ring at least partially projects into a recess of the adapter housing, the recess including a circumferential depression limited by a wall region of the adapter housing in a direction of the shaft;
   wherein the sealing ring touches and/or radially projects beyond the wall region; and
   wherein a sensor adapted to detect lubricating oil that drains into the depression is provided on the adapter housing.

2. The transmission according to claim 1, wherein the first shaft sealing ring is connected in a torsionally fixed manner to the housing part and sealed in a direction of the shaft, the first shaft sealing ring runs on the shaft, and/or a sealing lip of the first shaft sealing ring touches the shaft.

3. The transmission according to claim 1, wherein the sealing ring touches and/or radially projects beyond the wall region to axially flow lubricating oil down the shaft to drained into the recess and/or the depression.

4. The transmission according to claim 1, wherein the sensor is provided in a radially oriented bore hole that terminates in the depression.

5. The transmission according to claim 1, wherein the wall region is radially situated between the depression and the shaft.

6. The transmission according to claim 1, wherein the depression has an annular configuration and is limited by the wall region and by the rest of the adapter housing.

7. The transmission according to claim 1, wherein a radial clearance region covered by the sealing ring overlaps a radial clearance region covered by the wall region.

8. The transmission according to claim 1, wherein the sealing ring is set apart from the adapter housing in a radial direction.

9. The transmission according to claim 1, wherein the first shaft sealing ring is accommodated by a first ring part, at an inner side of the ring part, and the first ring part is accommodated by the housing part, the first ring part being tightly connected to the housing part, in an intermaterial fashion and/or by bonding, the first shaft sealing ring being radially located between the first ring part and the shaft.

10. The transmission according to claim 9, wherein a second shaft sealing ring seals the space region surrounded by the adapter housing from the environment, and wherein a safety washer axially limits the second shaft sealing ring, the safety washer being connected to the first ring part by screws.

11. The transmission according to claim 9, wherein the first ring part is connected to the adapter housing in an intermaterial fashion and/or by bonding.

12. The transmission according to claim 1, wherein a second shaft sealing ring seals the space region surrounded by the adapter housing from the environment.

13. The transmission according to claim 12, wherein the second shaft sealing ring is accommodated by a second ring part, at an inner side of the second ring part, the second ring part is accommodated in the housing part and/or is tightly connected to the housing part, in an intermaterial manner and/or by bonding, the second shaft sealing ring being radially located between the second ring part and the shaft.

14. The transmission according to claim 13, wherein the sealing ring is axially located between the first and the second ring part.

15. The transmission according to claim 1, wherein the sealing ring has a spin-off edge region and a sealing lip and/or a radial constriction is provided on the sealing ring between the spin-off edge region and the sealing lip.

16. The transmission according to claim 15, wherein a radial outer diameter of the sealing ring monotonically increases with an increasing distance from the space region that is at least partially filled with lubricating oil to form the spin-off edge region, then decreases to form the radial constriction and then increases again in order to form the sealing lip.

17. The transmission according to claim 1, wherein the sealing ring is arranged as a rotationally symmetrical body.

18. The transmission according to claim 15, wherein the sealing lip of the sealing ring has a monotonically decreasing wall thickness with an increasing distance from the spin-off edge region.

19. The transmission according to claim 15, wherein the sealing lip of the sealing ring is elastically pressed against the adapter housing and/or against a contact surface formed on the adapter housing, the contact surface being planar and/or a normal direction of the planar contact surface being aligned in parallel with an axial direction.

20. The transmission according to claim 1, wherein the adapter housing is made of a harder material than the housing part.

21. The transmission according to claim 1, wherein the adapter housing is made of GGG40 and the housing part is made of GG25.

22. The transmission according to claim 12, wherein the first bearing is axially situated between the sealing ring and the second shaft sealing ring.

23. The transmission according to claim 1, wherein the first bearing is arranged as an angular contact bearing.

24. The transmission according to claim 1, wherein the first shaft sealing ring includes two axially adjacently situated shaft sealing rings that contact each other.

25. The transmission according to claim 12, wherein the second shaft sealing ring includes two axially adjacently situated shaft sealing rings that contact each other.

26. The transmission according to claim 1, wherein a shaft sealing ring, which seals the housing part from the shaft, is arranged on a side of the second bearing axially facing away from the space region partially filled with lubricating oil.

27. The transmission according to claim 13, wherein the second ring part is connected to the housing part in an intermaterial fashion and/or by bonding.

\* \* \* \* \*